June 12, 1934.  H. G. LYKKEN  1,962,450
MATERIAL CLASSIFIER AND DISTRIBUTOR
Filed March 2, 1929  2 Sheets-Sheet 1
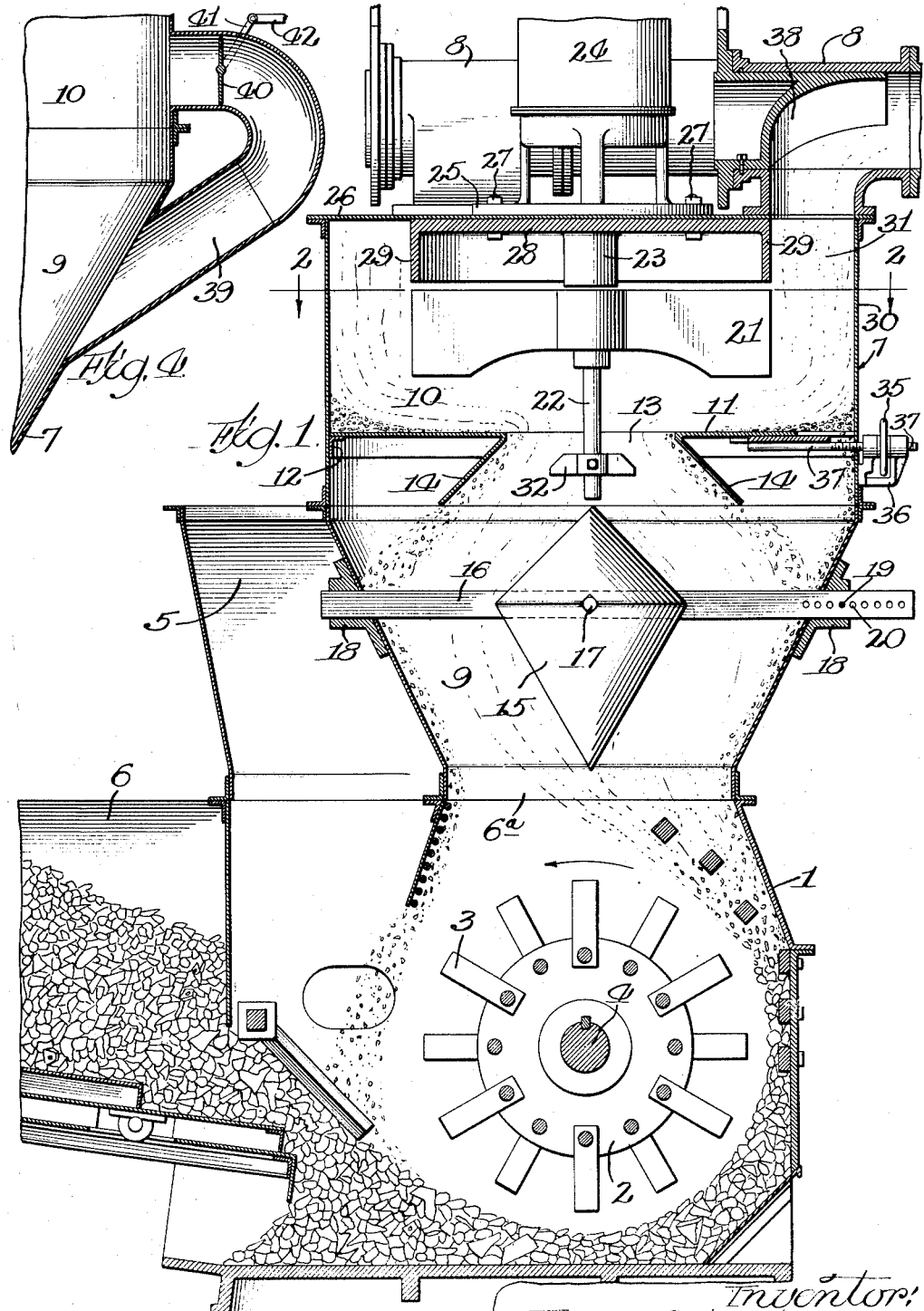

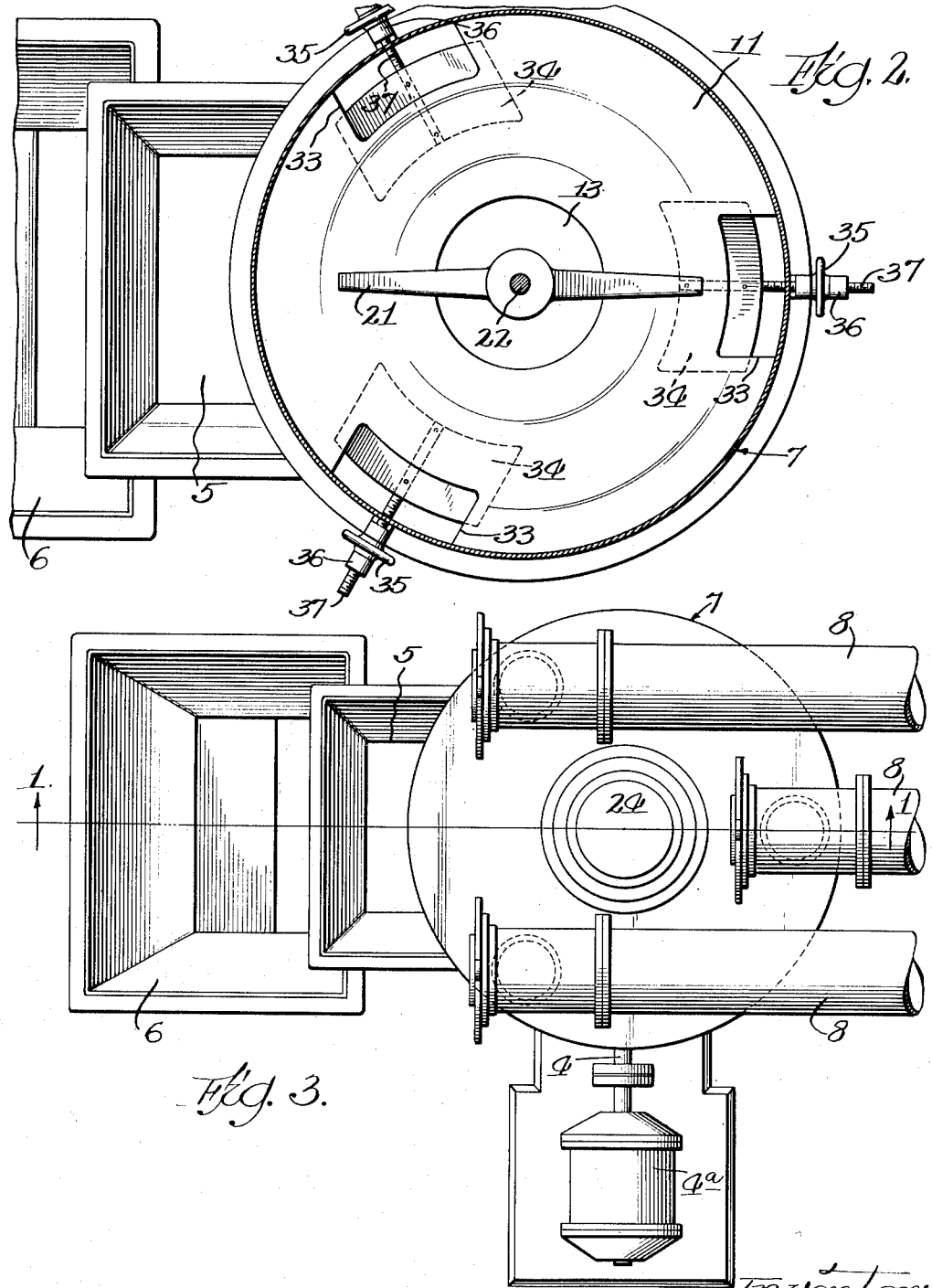

Patented June 12, 1934

1,962,450

UNITED STATES PATENT OFFICE 1,962,450

MATERIAL CLASSIFIER AND DISTRIBUTOR

Henry G. Lykken, Minneapolis, Minn.

Application March 2, 1929, Serial No. 343,986

9 Claims. (Cl. 209—139)

The present invention relates to the classifying and distributing of reduced material, and also the proper conditioning of the same for use.

Among the objects of the invention is to provide a novel device for, and a novel method of classifying reduced materials; to provide a novel device for distributing a material laden fluid body to one or more points or loci of distribution, proportionate to the amount of the body being consumed at such points; to provide a novel device and novel method for separating the larger and heavier material particles from a material laden fluid body; to provide a novel device for controlling the quantity of material laden fluid body passing through one or more outlets from a single reducer; to provide a novel device which will maintain a uniformity of mixture of air and reduced material, where it is desired to supply one or more consuming devices, when only one material reducer is available; to provide a novel device for distributing a material laden fluid body, wherein the degree of concentration of the material laden fluid body may be readily varied; to provide a novel device for distributing a material laden fluid body wherein the degree of concentration of the material laden fluid body may be varied at different consuming loci.

A further object of the invention is to provide a novel device for distributing a material laden fluid body having a plurality of outlets wherein both the degree of concentration and quantity of the material laden fluid body passing therethrough may be varied at any one or all of the outlets; further to provide a classifier and distributor of maximum simplicity, efficiency, economy, and ease of operation; and such further objects, advantages, features and capabilities as will later appear and as are inherently possessed thereby.

My invention is applicable to the separating and distribution of any reducible material, but for illustration it is herein described as a fuel device, and therefore has for an object the provision of a novel separator, in which the fuel entering the device is in a fluidal condition, and is acted upon to obtain the degree of fineness and the degree of concentration desired, and is then directed to the locus or loci of consumption in a state of uniformity, according to the demand at those loci.

The embodiment selected to illustrate the invention, comprehends the provision of a fan chamber with the side walls thereof substantially spaced from the peripheral parts of the fan to provide a free and substantial separating region around the fan and between the fan and the side walls of the chamber, the fan acting to aspirate the material laden fluid body through the device, and also acting to entrain air and material into the spaces between the fan and walls to cause a whirlpool or cyclonic action or a vorticose movement or an eddy whereby the air and material are carried around the outside of the fan to cause the larger and heavier particles in the material laden fluid body to be thrown out or cast off where they are by-passed for further reducing.

The illustrative embodiment also comprehends the provision of a distributing chamber with diverging mechanism located adjacent to the fan chamber and which is adjustable to provide for the feeding of a varying amount of material laden fluid body at different points adjacent to the periphery of the fan which when acted upon by the action of the fan, might result in varying the degree of concentration of the material laden fluid body at different outlet points in proximity to the fan elements.

An important feature is that the rotor elements in the device for distributing and separating, act to produce a whirlpool or cyclonic or vorticose movement in the material laden fluid body passing therethrough.

Referring to the drawings showing an embodiment of the invention:

Fig. 1 is a view in vertical cross-section through a device constructed in accordance with the invention and connected to a material reducing device.

Fig. 2 is a horizontal cross sectional view taken in a plane represented by line 2—2 of Fig. 1.

Fig. 3 is a top plan view of the device, showing a plurality of outlets from the fan chamber.

Fig. 4 is a fragmentary vertical cross sectional view of a fan chamber and inlet chamber showing an alternate construction of a by-pass that may be used with the device.

Referring more in detail to the drawings, the embodiment selected to illustrate the invention is shown as connected to the outlet of a material reducing device having a chamber 1 in which is rotatably supported a rotor 2 having radial projections or arms 3, the rotor being driven by a shaft 4 having suitable bearings in the side walls of the chamber 1 and operated from a suitable source of power, as a motor $4^a$. At one side of the chamber 1 is provided an air intake conduit 5, through which an air stream is directed to the lower portion of the reducing mill or chamber 1. Likewise, at the side of the chamber is provided a hopper 6 in which material may be held and fed into the chamber of the reducing device. This material together with the air stream, is acted upon by a cyclonic or vorticose current produced by the rotor arms 3, to reduce said material. The reduced material and air are forced out through the outlet 6ª, the material laden fluid body of air and combustible floated particles being then classified within a housing 7, connected to the outlet of the reducing device or chamber 1, and distributed through the outlets 8 of the classifier.

Referring to the classifier and distributor, the housing 7 is divided into two chambers 9 and 10 by a diaphragm 11 which may rest or be held in position by suitable means on an annular angle iron 12, which in turn is secured or adjustably connected to the interior circumferential face of the housing 7. The diaphragm 11 and angle iron 12 may be adjustably connected in the housing 7 to permit the ratio of the volumes of the chambers 9 and 10 to be changed, depending on the type and quality of the reduced material being classified. The diaphragm 11 has a preferably concentric orifice 13 with a circular wall forming truncated conical inlet or throat 14 in the inlet chamber 9, and converging toward the fan chamber 10. It will be noted that the outlet 6ª of the reducing chamber 1 is in effect the inlet for the chamber 9.

A deflector body 15 conically shaped at its lower and upper ends, is provided in the inlet chamber and its lower conical shaped end is in association with the outlet 6ª from the reducing chamber 1, and its upper conical shaped end associated with the throat 14 and orifice 13 in the diaphragm 11. The body 15 is adjustably supported by a bar 16 and may be secured to the bar by a set screw 17, the ends of the bar being slidably journalled in bearing members 18 connected to the walls of the inlet chamber 9. The body 15 may be positioned within the chamber 9 on the horizontal plane of the bar 16 and held in place by means of a pin 19 passing through one of a number of holes 20 on the operating end of the bar, the pin passing through the bearing member 18 and holding the bar 16 and the body 15 in any selected position. The shape and size of the body member 15 may be changed and the means for suspending and adjusting altered for placing the body in any position within the chamber 9, to adapt the device to whatever kind of reduced material is passing through the classifier. The purpose of the body 15 is to deflect and distribute the material laden fluid body passing through the inlet chamber 9 to the orifice 13, and into the fan chamber 10. The adjustable features are provided to more advantageously position the body 15 to obtain the even distribution of the material laden fluid body as it passes into the fan chamber 10, as also for effecting uniformity of the material mixture at the discharge outlets of the device.

In the upper or fan chamber 10 is provided a rotor or fan 21, slidably and adjustably connected to a vertical shaft 22 which is journalled in a bearing 23 and driven by a motor (not shown) in a motor housing 24, the base 25 of which is bolted or connected to the top or coverplate 26 of the housing 7 by bolts 27. These bolts 27 also serve to hold or position the base of an inverted cylindrical member 28, the annular wall 29 of which with the wall 30 of the fan chamber 10 forms an outlet chamber 31 which is a part of the fan chamber 10, and is located adjacent to the outlets 8.

The shaft 22 extends downwardly through the orifice 13 in the diaphragm 11 and into the throat or space formed by the truncated conical inlet member 14 in the inlet chamber 9. Slidably and adjustably connected on this shaft 22, and in association with the orifice 13, is a rotor or fan member 32, which is rotated by the motor in the casing 24. This fan member 32 rotates at the same speed as the fan 21, and may be adjusted in position either toward or away from the orifice 13. This fan member 32 sets up a vorticose movement at the entrance to the orifice 13 and in the material laden fluid body entering the fan chamber 10, which movement tends to cast off the larger particles in the body, so that they may impinge against the surface 14 and drop back into the chamber 1 to be re-reduced and again aspirated upward through the classifier. Although I have shown a fan with two radial blades and of a particular design, it is to be understood that the invention comprehends using any other number of blades, such as a single blade or any plural number of blades, also that the size, shape and the positioning of this fan member 32 may be varied, depending upon the kind and quality of the reduced material being separated and distributed and also upon the degree of fineness of the fluidal material desired in the material laden fluid body.

The fan 21 rotated by the shaft 22, is of the radial bladed type having two blades in the embodiment shown to disclose the invention, although a single or more than two blades may be used dependent on the kind of reduced material being separated and distributed, the amount of material laden fluid body being passed through the outlets 8, likewise the amount of pressure desired at the outlet points and the amount of vorticose movement desired in the fan chamber. The size and shape of this fan may also be varied to conform with the actual requirement of the material being separated to condition it for the purpose for which it is to be used.

The fan 21 is preferably spaced from the diaphragm 11 and when rotated, sets up a vorticose movement in the space between diaphragm 11 and fan 21 and around the orifice 13, as also in the space between the ends of the blade elements and the walls of the chamber 10, and in chamber 31. The material laden fluid body thus moves up in the inlet chamber 9, and through the orifice 13, into the fan chamber 10—31. The vorticose movement of the fluidal material will cause a casting off of the heavier and larger particles which impinge on the lower part of the chamber walls 30 and drop onto the diaphragm 11 for return through by-pass means, later described. The remainder of the fluidal mass continues to swirl in a continuous cyclonic or vorticose path in the direction of the rotation of the fan.

A plurality of ports 33 in the diaphragm 11, provide a further means of classification and for obtaining the degree of concentration and fineness of the reduced material in the fluidal material body passing through the classifier and out to the points of consumption. The size of the ports 33 may be varied and closed by slides 34 slidable on the under side of the diaphragm 11 by the operation of hand wheels 35 suitably journalled in brackets 36 on the outside of the housing 7, and internally threaded for engaging the threaded ends of stems 37 extending through the walls of the housing 7, these stems being connected to the slides 34.

As the reduced material in the fluidal material body assumes a vorticose or cyclonic action in the fan chamber, the coarser and heavier particles are cast out, and then due to the action of gravity, these particles work their way toward the bottom of the collected particles at these points in the chamber. Because of the difference in pressures in the fan chamber 10 and inlet chamber 9, there will be a current of air through the ports 33, and which may be regulated to draw off and return to the chamber 1, by way of the inlet chamber, the larger and heavier material particles.

These ports are of further importance inasmuch as by the regulation of the same, the concentration of the material in the material laden fluid body passing out through the outlets 8 may be regulated by drawing off and returning a portion of the material tending to pass through the fan chamber to the outlets. These ports 33 may be used in combination with the fan member 32 to obtain the degree of concentration and fineness of the material in the fluidal body or either one may be used separately.

The outlet conduits 8 as shown, are of equal diameter and are positioned equi-distant about the periphery of the top plate 26 of the fan chamber 10. However, any number, single or plural, or size of outlet conduits may be provided. Regulation of the amount passing through the individual outlets 8 may be accomplished by providing these outlets with a rotating valve mechanism 38 which operates to close the outlets in part or completely as desired.

Fig. 4 shows an alternate device for by-passing the larger and heavier material particles cast out of the material laden fluid body in the fan chamber, due to the cyclonic vorticose action of the fan. This device comprises a by-pass conduit 39 connected at its upper end with the fan chamber 10 and at its lower end with the inlet chamber 9. Suitable mechanism, as a damper 40 in the by-pass conduit and operated by lever arms 41 and 42, suitably fulcrumed, is provided to regulate the size and quantity of material to be by-passed. Although I have shown and described this by-pass mechanism as being attached to and adapted for use in conjunction with the by-passing of material from the periphery of the lower portion of the fan chamber, it is also comprehended that this mechanism could be adapted for use at any other point in the device to by-pass similar accumulations of the larger and heavier material particles.

By the invention, it is possible to obtain a very close control of the degree of concentration and fineness, and of the uniformity of the material in the material laden fluid body which is being used and consumed at the consuming loci. The body member 15, the fan member 32, the fan 21 and the valve mechanism 38, together with a by-pass mechanism located on the diaphragm 11, are all individually adjustable, whereby the proper regulation of the fluidal body may be obtained. By means of the valve mechanism 38, any one or more of the outlets may be closed when it is desired, the material then passing uniformly through the other outlet or outlets.

While I have herein described and upon the drawings shown illustrative embodiments of the invention, it is to be understood that the latter is not limited thereto, but comprehends other details, arrangements of parts, features and constructions, without departing from the spirit thereof.

Having thus disclosed the invention; I claim:

1. A material classifier comprising a chamber having an inlet and an outlet for movement therein of a material laden fluid body, an orifice means in said chamber and intermediate said inlet and outlet, rotative vorticose producing means in said orifice means and material laden fluid body, and means for adjusting the position of said vorticose producing means.

2. A material classifier comprising a chamber for movement therein of a material laden fluid body, a plurality of discharge outlets from said chamber, means in said chamber for aspirating the fluid body through the classifier and to force the material laden fluid body through the outlets under pressure, and means at said outlets for regulating the flow of the material laden fluid body through said outlets.

3. A material classifier comprising a chamber for movement therein of a material laden fluid body provided with inlet and outlet means, a fan in said chamber for creating a vorticose movement therein, and means in the chamber for retaining cast-off particles of material from said body, said inlet means converging toward said chamber.

4. A material classifier comprising a housing for movement therein of a material laden fluid body, said housing having inlet and outlet means, a fan in said housing for producing a vorticose movement therein, a diaphragm in the housing, said housing retaining cast-off particles of material from said body, said diaphragm having means for regulating the size of the cast-off particles to be retained.

5. A material classifier comprising a housing for movement therein of a material laden fluid body and provided with inlet and outlet means, a fan in said housing for producing a vorticose movement therein, said housing having by-pass means for regulating the size of the particles passing through the outlet, and means regulating the size of particles to be cast out.

6. A material classifier comprising a housing for movement therein of a material laden fluid body and provided with inlet and outlet means and inlet and fan chambers, orifice means intermediate the inlet and fan chambers, a distributing means in said inlet chamber to distribute said body through the orifice, a fan in said fan chamber and spaced from said orifice means and away from the walls of said chamber to produce a vorticose movement about the orifice means and said fan in a material laden fluid body, and regulating means in the outlet means for controlling the amount of the material laden fluid body being discharged therefrom.

7. A material classifier comprising a housing for movement therein of a material laden fluid body and provided with inlet and outlet means, inlet and fan chambers, orifice means between the inlet and fan chambers, an adjustable distributing means in said inlet chamber to distribute said body through the orifice, means associated with said orifice means for producing a vorticose movement at said orifice, a fan in the fan chamber and spaced from said orifice means and away from the walls of said chamber to produce a vorticose movement about the orifice means and said fan in a material laden fluid body, by-pass means in the housing for casting out particles of material from said body.

8. A material classifier comprising a chamber constructed and arranged for movement of a material-laden fluidal body therein, said chamber having an outlet orifice, a distributor within said chamber positioned adjacent said outlet, so as to control the distribution of said material as it enters said orifice, and a rotor within said orifice for producing vorticose movement in said fluidal body as it passes through the orifice, said rotor being adjustable axially within the orifice so as to vary the vorticose movement of the fluidal body as it is discharged through the orifice.

9. A material classifier comprising a chamber provided with a transversely disposed bottom wall having an inlet orifice and guiding means converging thereto, outlet means for said chamber, a fan rotatively mounted in said chamber at a position opposite said inlet orifice and radially spaced from the side walls of the chamber, so that a vorticose movement is imparted to the material-laden fluidal body passing through said orifice, and in the space between the fan and the side walls, said bottom wall intersecting said side walls so as to intercept and collect the heavier material particles thrown out by said fan.

HENRY G. LYKKEN.